United States Patent [19]

Shen et al.

[11] Patent Number: 5,746,949
[45] Date of Patent: May 5, 1998

[54] POLARIZER FILMS COMPRISING AROMATIC LIQUID CRYSTALLINE POLYMERS COMPRISING DICHROIC DYES IN THEIR MAIN CHAINS

[75] Inventors: Sunny S. Shen, Holmdel, N.J.; David W. Polis, Redondo Beach, Calif.; Hyun N. Yoon, New Providence; Tze-Pei Tien, Basking Ridge, both of N.J.

[73] Assignee: Hoechst Celanese Corp., Somerville, N.J.

[21] Appl. No.: 561,607

[22] Filed: Nov. 21, 1995

[51] Int. Cl.$^6$ .............................. F21V 9/14; C09K 19/00
[52] U.S. Cl. ................................ 252/585; 252/299.1
[58] Field of Search ........................... 252/585, 299.1

[56] References Cited

U.S. PATENT DOCUMENTS

| | | | |
|---|---|---|---|
| 4,631,328 | 12/1986 | Ringsdorf et al. | 252/299.1 |
| 4,840,640 | 6/1989 | Miura et al. | |
| 5,389,285 | 2/1995 | Shannon et al. | 252/299.1 |
| 5,543,267 | 8/1996 | Stumpe et al. | 252/585 |
| 5,672,296 | 9/1997 | Shen et al. | 253/299.1 |

FOREIGN PATENT DOCUMENTS 31 48 787 A1  12/1981  Germany ................... G02B 5/30

OTHER PUBLICATIONS

Database WPI, Week 8838, Derwent Publications, Ltd., London, GB; AN 88-267839 & JP,A,63 195 602 (Mitsubishi Chem Ind), Oct., 1988.
Database WPI, Week 8741, Derwent Publications Ltd., Londong, GB; AN 87-289507 & JP,A,62 204 202 (Mitsubishi Chem Ind), Oct., 1987.
Patent Abstracts of Japan, vol. 011, No. 370 (P-642), 3 Dec. 1987 & JP,A,62 141503 (Toray Ind. Inc; Others:01), 25 Jun. 1987 & Database WPI, Week 8731, Derwent Publications Ltd., London, GB; An 87-216446 & JP,A,62 141 503 (Toray Ind Inc., Sumitomo), Aug. 1987.
Patent Abstracts of Japan, vol. 011, No. 398 (C-466), 25 Dec. 1987 & JP,A,62 158758 (Sumitomo Chem Co), 14 Jul. 1987 & Database WPI, Week 8733, Derwent Publications Ltd. London, GB; AN 87-233055 & JP,A,62 158 758 (Sumitomo Chem), Sep., 1987.

*Primary Examiner*—Philip Tucker
*Attorney, Agent, or Firm*—Palaiyur S. Kalyanaraman

[57] ABSTRACT

This invention provides novel liquid crystalline polymers which comprise, in the repeat units of their main chains, residues of suitable dichroic dyes. The polymers yield polarizer films with superior polarizing efficiency, transmittance, dichroic ratio, and thermal and humidity stability. The invention further discloses suitable processes to prepare such polymers and polarizer films therefrom.

26 Claims, No Drawings

POLARIZER FILMS COMPRISING AROMATIC LIQUID CRYSTALLINE POLYMERS COMPRISING DICHROIC DYES IN THEIR MAIN CHAINS

FIELD OF THE INVENTION

This patent application discloses novel liquid crystalline polymers which contain dichroic dyes as part of their main chains. The invention herein is related to that disclosed in pending U.S. patent application Ser. No. 08/460,288, filed Jun. 2, 1995, now Pat. No. 5,672,296.

BACKGROUND OF THE INVENTION

Polarizers are important components of liquid crystal displays. Liquid crystal displays (LCDs) are widely used components in applications such as, for example, Notebook Personal Computers (PCs), calculators, watches, liquid crystal color TVs, word processors, automotive instrument panels, anti-glare glasses and the like. Typically, polarizers are used in the form of film, the polarizer film (also called polarizing film). In an LCD, the liquid crystal elements are generally sandwiched between two layers of polarizing films which regulate the incident light that enters the liquid crystal producing an on-and-off contrast.

The polarizing film traditionally comprises a stretched polymer film such as, for example, polyvinyl alcohol (PVA), a colorant and other optional layers. The colorant is usually iodine or a dichroic dye that is absorbed on the polymer film. This arrangement may then be coated or sandwiched on both sides with a substrate such as, for example, polyethylene terephthalate (PET), polymethyl methacrylate (PMMA), triacetyl cellulose (TAC), and the like. This may further be coated with an adhesive layer, protective layer, and the like.

The nature and quality of the polarizing film influences the performance of the polarizer as well as the device wherein the polarizing film is used. Traditional polarizing films such as stretched PVA are increasingly found to be inadequate in performance. Their limitations have become apparent with increasingly sophisticated applications for polarizers and LCDs. More and more, the environment for use of these materials is becoming increasingly harsher in terms of temperature, humidity and the like. PVA films lack the needed heat and humidity resistance, strength, dependability, ease of use and ease of processing. Furthermore, they frequently suffer from deterioration of optical properties, such as a decrease in polarizing efficiency when exposed to high humidity/heat environment. Accordingly, improved polarizing films are urgently required to satisfy increasingly sophisticated applications.

Several attempts have been made to improve the quality and performance of polarizer films with limited success. U.S. Pat. Nos. 5,310,509 and 5,340,504 disclose polarizing films based on water-soluble organic polymers such as polyvinyl alcohol and dichroic dyes. U.S. Pat. Nos. 4,824,882 and 5,059,356 disclose polyethylene terephthalate ("PET") films for polarizer applications. U.S. Pat. No. 5,318,856 discloses films of polyvinyl alcohol, polyvinyl formal, polyvinyl acetal and polyvinyl butyral. U.S. Pat. No. 4,842,781 discloses films of polyvinyls, polyester and polyamides. These polymers, however, still have the same disadvantages of PVA, especially in thermal and humidity resistance.

U.S. Pat. No. 5,071,906 discloses a polarizing film comprising a uniaxially stretched PVA having a degree of polymerization of about 2,500–10,000, and a colorant. While this is a slight improvement over traditional lower molecular weight PVA, it still suffers from the disadvantages of PVA. Furthermore, the film will still have to be stretched to achieve orientation.

It is known that liquid crystal polymers do not need to be stretch oriented. The process of molding or extrusion generally achieves high degree of orientation in such polymers. For this reason, liquid crystal polymers would be ideal candidates for polarizer substrate film applications. For example, Japanese patent application JP 62-28698 (filed Feb. 10, 1987) discloses a polarizing film consisting of a thermotropic liquid crystal polyester film with a dichroic coloring matter dyed and oriented, wherein the polymer is a copolyester of a hydroquinone derivative (A), a terephthalic acid ingredient (B), an isophthalic acid ingredient (C) and a parahydroxybenzoic acid ingredient, with the molar ratio of A to D being in the range 5:95 to 70:30% and the molar ratio of B to C being in the range 50:50 to 100:0%. The disclosed polymer compositions are difficult or nearly impossible to make. Additionally, the monomer ratios disclosed for those polymers do not necessarily yield a balanced formula for preparing liquid crystalline polymer compositions. Moreover, if even one could make such polymers, any films from such polymers are likely to be substantially deficient in optical transparency, orientation and heat/moisture resistance, which therefore would limit and/or prevent any potential utility as polarizing films, especially in stringent environments.

U.S. Pat. No. 4,840,640 discloses the use of "liquid crystalline polyethylene terephthalate-parahydroxybenzoic acid," formed by copolymerizing a polyethylene terephthalate component (A) with a parahydroxybenzoic acid component (B) with the A:B molar ratio being in the range 40:60 to 5:95. Optical properties are a concern with such compositions. Such compositions have to be first blended with a dichroic acid and then formed into a film through a die at a high shear rate to achieve satisfactory film orientation and transparency. Insufficient transmittance of the light at the wavelength employed would preclude use of films from such polymers for polarizer applications. Perhaps because of such limitations of these "improvements," films based on PVA are still the only ones commercially available for polarizer uses, despite their own disadvantages mentioned earlier.

Pending U.S. patent application, Ser. No. 08/460,288, filed Jun. 2, 1995, discloses polarizing films from novel compositions comprising blends of (a) a film-forming, wholly aromatic thermotropic liquid crystalline polymer ("LCP"), and (b) a suitable dichroic dye. The preferred LCP therein is a polyester or a polyesteramide, comprising repeat units corresponding to the formula:

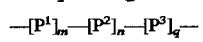

wherein $P^1$ is an aromatic hydroxy monocarboxylic acid or an aromatic amino carboxylic acid; $P^2$ is an aromatic dicarboxylic acid; $P^3$ is a phenolic compound; m, n and q represent mole percent of the respective monomers, with m+n+q totalling 100 mole percent. While m, n, and q may generally range from 0–70% individually, the preferred range of m is about 0–40%, n is about 0–40% and q is about 0–30%.

It is an object of this invention to provide a substantially improved polarizing film useful for existing as well as sophisticated applications. It, however, would be still more desirable if all components are covalently linked in the composition rather than blends.

Accordingly, it is another object of this invention to provide an improved polymeric film useful for polarizer applications.

It is an additional object of this invention to provide polymer compositions that contain suitable dichroic dyes covalently linked as part of the main chain of the polymer, which polymer compositions can be formed into films useful for polarizer applications.

It is yet another object of this invention to provide polymers which can form films with high orientation, optical transparency, moisture resistance and heat resistance with minimal processing needs.

It is a further objective of this invention to provide polymers which contain dichroic dyes in the main chain of the polymer and which can be processed at high temperatures to provide polarizing films with high orientation, dichroic ratio and polarizing efficiency.

SUMMARY OF THE INVENTION

One or more of the objects of the present invention are accomplished by the provision of a polarizing film which possesses a polarizing efficiency of at least 70%, and comprises a film-forming, thermotropic liquid crystalline polymer ("LCP"), which comprises, as part of its main chain, a suitable dichroic dye. The LCP may be a polyester, polyamide, polyesteramide, polyketone, polycarbonate, polyurethane, polyether and the like. A preferred LCP is a polyester or a polyesteramide. An inventive polymer composition, suitable to form polarizing films therefrom, comprises repeat units corresponding to the formula:

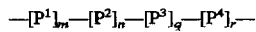

wherein $P^1$ is an aromatic hydroxy monocarboxylic acid or an aromatic amino carboxylic acid; $P^2$ is an aromatic dicarboxylic acid; $P^3$ is a phenolic compound; $P^4$ is a suitable dye molecule; m, n, q and r represent mole percent of the respective monomers, with m+n+q+r totalling 100 mole percent. While m, n, and q may generally range from 0–70% individually, and r in the range 0.10–20 mole percent, the preferred range of m is about 0–40%, n is about 0–40%, q is about 0–30% and r is about 0.10–20%. In addition to $P^1$, $P^2$, $P^3$, and $P^4$, additional monomeric moieties such as, for example, a second aromatic amino carboxylic acid moiety or an aromatic hydroxy carboxylic acid moiety —[$P^5$]$_s$—, a diphenol moiety —[$P^6$]$_t$, and the like, may be part of the polymer repeat unit, in which case s is about 5–20 mole %, and t is about 5–20 mole %, with the total m+n+q+r+s+t being adjusted to be 100 mole %. $P^5$ is different from $P^1$ and $P^6$ is different from $P^3$. By suitable choice of monomers for $P^1$, $P^2$, $P^3$, $P^4$ $P^5$ and $P^6$, and for any other additional moieties, as well as their mole percents, the invention provides polymers with the above-mentioned substantially improved polarizer characteristics and uses.

The invention further provides a process to make such compositions.

DESCRIPTION OF THE PREFERRED EMBODIMENTS

In one embodiment, the present invention discloses polarizing films with high orientation, optical clarity, dichroic ratio, polarizing efficiency, and humidity/heat resistance. The term "high orientation" refers to orientation of at least 90%. The term "high optical clarity" refers to amorphousness and is measured by light transmission of at least 30% in the wavelength range 350–750 nm. The term "high dichroic ratio" refers to ratio of at least 8 and "high polarizing efficiency" refers to polarization efficiency of at least 70%. The term "high humidity/heat resistance" refers to no substantial change in the optical properties of the film when the film is exposed to environmental conditions of at least about 90% humidity and temperatures of at least about 90° C. for at least about 100 hours.

The inventive polarizing films are obtained from inventive polymer compositions comprising suitable dichroic dye residues as part of their main chain. The inventive polymer compositions are film-forming, thermotropic liquid crystalline polymers which may be liquid crystalline polyesters, polyamides, polyesteramides, polyketones, polycarbonates, polyurethanes, polyethers and the like, or combinations of such functional groups in the same polymer chain. Preferred LCP is a film-forming, thermotropic liquid crystalline polyester or a polyesteramide. Suitable dyes are disclosed in the afore-mentioned pending U.S. patent application Ser. No. 08/460,288. A typical preferred polymer is characterized by the repeat units:

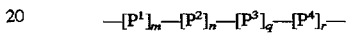

wherein $P^1$, $P^2$, $P^3$, $P^4$, m, n, q and r are as described above. Examples of $P^1$ include, but are not limited to, monomers such as 4-hydroxybenzoic acid, 3-phenyl-4-hydroxybenzoic acid, 3-methyl-4-hydroxybenzoic acid, 3chloro-4-hydroxybenzoic acid, 2-hydroxy-6-naphthoic acid, 4-aminobenzoic acid and 4-carboxy-4'hydroxy-1.1'-biphenyl. Examples of $P^2$ include, but are not limited to, terephthalic acid, isophthalic acid, phthalic acid, 2-phenylterephthalic acid, 3-phenylterephthalic acid, 3-methylterephthalic acid, 3-chloroterephthalic acid, 1,2-naphthalene dicarboxylic acid, 1,4-naphthalenedicarboxylic acid, 2,6-naphthalene dicarboxylic acid and 4,4'-biphenyldicarboxylic acid. Examples of $P^3$ include, but are not limited to, resorcinol, hydroquinone, methyl hydroquinone, phenyl hydroquinone, catechol, 4,4'-dihydroxybiphenyl, and acetaminophen. $P^4$ refers to suitable dichroic dye molecules with polymerizable functionalities at both ends, thus facilitating their incorporation into the polymer main chain by covalent bonding. Examples of such polymerizable functionalities include, but are not limited to the combinations of (i) an OH and COOH; or (ii) an $NH_2$ and COOH; or (iii) an OH and COOH; or (iv) an OH and COCl; or (v) an $NH_2$ and COCl; or (vi) two OH groups or (vii) two $NH_2$ groups; or (viii) two COOH groups. Suitable dichroic dyes include, but are not limited to, straight chain dyes, branched dyes, direct dyes, disperse dyes, acidic dyes and the like. Yellow, orange, blue, purple or red dyes are all suitable. Several classes of suitable dyes are well known to those skilled in the art. They include, but are not limited to azo dyes, anthraquinone dyes, commercially available dyes such as Basic blue 17, Acid Orange 6, Basic Red 2, Direct Yellow 59, LacMoid, Fluorescein diacetate and its derivatives, Darrow Red thionin (Lauth's Violet), 2,5-bis(4-hydroxyphenyl)pyrazine (Leman Yellow), and the like. More than one dye molecular system may also be used. The choice of suitable dichroic dye or dyes depends on several factors, as is well known to those skilled in the art. Some such factors include, but are not limited to, light fastness and the transition moment of the dye, as well as the nature of the polymerizable functionalities on the dye moiety. Nonlimiting examples of $P^4$ are given in Formula I, while the preferred structure for $P^4$ ("5 ring diacid") is shown in Formula II:

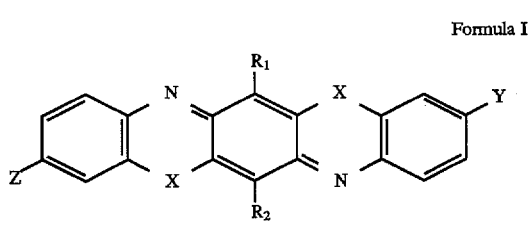

Formula I

X=O or S

R$_1$=H, C$_1$–C$_6$ alkyl, halogen, Ph, naphthyl

R$_2$=H, C$_1$–C$_6$ alkyl, halogen, Ph, naphthyl

R$_1$ and R$_2$ may be the same or different.

Y and Z may be the same or different and are selected from:

—OH

—CO$_2$H

NH$_2$

—COCl

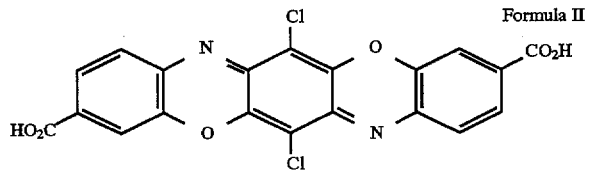

Formula II

Some such molecular units are known in the art. See, for example, L. Yu et al, "Advances in the Synthesis of Electroactive Materials in the characterization of mechanism of NLO activity," in *Organic Materials for Nonlinear Optics and Photonics*, J. Messier et al., ed., Kluwer Academic Publishers, Netherlands, pages 273–299 (1991).

Additional monomers such as a second hydroxy carboxylic acid or a second amino carboxylic acid P$^5$, a diphenol P$^6$, or a suitable second dye molecule, and the like, may also be part of the polymeric repeat unit; P$^5$ is different from P$^1$, and P$^6$ is different from P$^2$. Examples of P$^5$ include, but are not limited to, 4-hydroxybenzoic acid, 2-hydroxy-6-naphthoic acid, 4-aminobenzoic acid and 4-carboxy-4'hydroxy-1,1'-biphenyl. Examples of P$^6$ include, but are not limited to, resorcinol, hydroquinone, methyl hydroquinone, phenyl hydroquinone, catechol, 4,4'-dihydroxybiphenyl and acetaminophen. When there are six such monomers listed above, the monomers P$^1$, P$^2$, P$^3$, P$^4$, P$^5$ and P$^6$ are present in amounts of 0–40, 0–40, 0–30, 0.10–20, 5–20 and 5–20 mole percent respectively. Still additional monomers such as, for example a third diphenol, a third hydroxy carboxylic acid or a third amino carboxylic acid and the like, may also be present in the repeat unit in suitable amounts. In selecting monomers and their quantities, care should be taken not to sacrifice the desired properties of the polymer. Suitable choice of monomers and their respective amounts leads to the inventive polymers with desired properties.

The invention may be illustrated by the liquid crystalline polyester, prepared from the monomers 4-hydroxybenzoic acid ("HBA") for P$^1$, 6-hydroxy-2-naphthoic acid ("HNA") for P$^2$, terephthalic acid ("TA") for P$^3$, the 5-ring diacid (see above) for P$^4$, and 4,4'-biphenol ("BP") for P$^5$ in its repeat unit in the approximate ratio 30:30:19.5:0.5:20 respectively. Preparation of the LCP composition may be done by any known method. In a typical synthesis, the above-noted five monomers in their respective mole ratios are mixed in a suitable apparatus containing a suitable distillation head. The contents are kept in an inert atmosphere while a catalyst such as, for example, potassium acetate, and a solvent such as, for example, acetic anhydride are added to the ingredients and the mixture is heated and stirred in an oil bath. The temperature is raised high enough for acetic acid to distil over. After almost all acetic acid has been possibly removed, the apparatus is evacuated when the desired polymer forms as a polymer melt. As any remaining acetic acid distils over, the viscosity keeps increasing. The apparatus is then cooled to, for example, ambient temperature, when the desired is isolated.

The polymer may be analytically characterized by measuring polymer properties such as inherent viscosity ("I.V."), as well as by other techniques such as differential scanning calorimetry ("DSC"), thermogravimetric analysis ("TGA"), NMR, IR and the like conventional methods well known to those skilled in the art. I.V. may be defined as:

$$I.V.=1\ n(\eta_{rel})/c$$

where c is the concentration of solution (0.1 wt %), and $\eta_{rel}$=relative viscosity. The relative viscosity may be measured by dividing the flow time in a capillary viscometer of the polymer solution by the flow time of the pure solvent. DSC gives a good indication of the glass transition temperature (T$_g$) while hot stage optical microscopy measures the liquid crystalline phase change and the anisotropy of the melt. In a typical preparation of an inventive polymer with the above-noted molar ratios, the polymer had an I.V. of about 2.7 dl/g as determined in a pentafluorophenol solution of 0.1 weight percent concentration at about 60° C. DSC measurement (10° C./min heating rate) showed the T$_g$ to be about 116° C. and the melt temperature T$_m$ (defined as the peak temperature of a melt endotherm in DSC) to be about 249° C. Hot-stage cross-polarized optical microscopy showed a solid-to-liquid crystalline transition (T$_{s-lc}$) at about 103° C. with the polymer melt being optically anisotropic.

By varying the chemical nature of the monomers P$^1$, P$^2$, P$^3$, P$^4$, P$^5$ and P$^6$, and their amounts in the polymerizations, several polymers may be prepared.

An embodiment of the present invention includes polarizing films made with the inventive liquid crystalline polymers. Several methods of shaping polymers into articles are known to those skilled in the art. A preferred method to form films is by extrusion. The polymer may be charged into a suitable melt extrusion apparatus, melted and the melt then extruded to a suitable dimension polarizer film. This process has the added advantage that film dimensions can be easily changed by changing the extrusion die accordingly. The choice of a suitable dye unit has relevance in this process of melt blending and extrusion, due to the fairly high temperatures encountered in the extrusion. The polymer has to possess adequate thermal stability at such temperatures. The inventive polymers fit that requirement very well. The process also takes advantage of the high orientation achievable from such liquid crystalline polymers.

Characterization of the inventive polarizer film may be performed by well known methods in the art. Polarizer films prepared according to the present invention have high orientation, high thermal and humidity resistance and also possess excellent optical characteristics such as light transmittance and polarizing coefficient in the wavelength desired. The desired wavelength generally depends on the dye unit in the repeat unit of the polymer. In a typical experiment, for example, a film prepared as described above was melt extruded at temperatures above 200° C. to form a polarizer film. Optical properties of this film including polarizing efficiency were measured according the procedure described in U.S. Pat. No. 5,071,906 cited above. The film had a red color with transmittance of about 40% and a polarizing efficiency of about 93% in the wavelength region 550–630 nm. Even after subjecting this film to an environment of 100° C. and 95% Relative Humidity ("R.H.") for about 120 hours, the polarizing efficiency stayed at about 92%, with virtually no change. For comparison, two commercially available polarizer films, one based on PVA and iodine and the other based on PVA and a dichroic dye, were tested under the same conditions. The polarizing efficiencies of these comparative films dropped off either totally or substantially after exposure to the above-noted heat/humidity environment, demonstrating the superior optical properties and thermal/humidity resistance of the inventive polarizer films over conventional polarizer films.

In addition to offering polarizers with superior properties, the present invention allows one to tailor-make polarizer films to suit different wavelengths. This is done by appropriately selecting the dye molecular unit. Yet another advantage of the invention is the feasibility to construct a neutral color polarizer by using a polarizer film wherein the polymer repeat unit contains more than one dye moiety, each dye moiety absorbing at different wavelengths, e.g., red and blue. A further advantage is to prepare more than one polymer, each polymer comprising, in its repeat unit, dyes that absorb at selected different wavelength, and then melt blend the polymers.

The preferred process to prepare the polarizer film is melt extrusion; no solvents are generally needed. Furthermore, the extrusion temperatures can be easily adjusted to suit different LCP compositions. Thus the inventive process is much more versatile than the conventional methods of preparing polarizer films. Additionally, the present invention advantageously offers superior liquid crystal display devices based on and incorporating the inventive polarizer films.

The following EXAMPLES are provided to further illustrate the present invention, but the invention is not to be construed as being limited thereto.

EXAMPLES

Example 1. Preparation of a polyester

This example illustrates the preparation of a polyester from a 0.5 mole reaction mixture of 4-hydroxybenzoic acid ("HBA"), 6-hydroxy-2-naphthoic acid ("HNA"), terephthalic acid ("TA"), 4,4'-biphenol ("BP"), and 5-ring diacid dye ("5-R") in the ratio 30:30:19.5:20:0.5.

To a 300 ml 3-neck flask equipped with a half-moon shaped Teflon stirrer blade, gas inlet tube, thermocouple, a Vigreux column attached to a condenser and receiver were added the following:

a) 20.720 grams of 4-hydroxybenzoic acid (0.15 moles);

b) 28.227 grams of 6-hydroxy-2-naphthoic acid (0.15 moles);

c) 16.201 grams of terephthalic acid (0.0975 moles);

d) 18.605 grams of 4,4'-biphenol (0.1 moles);

e) 1.102 grams of 5-ring diacid dye (0.0025 moles);

The flask was immersed in a oil bath and provided with means to accurately control the temperature. The flask was thoroughly purged of oxygen by evacuation and flushed with nitrogen three times, and slowly heated in the oil bath; and f) 0.01 grams of potassium acetate was added as a catalyst along with 52.74 grams of acetic anhydride (2.5% excess).

Acetic acid began to distill over and was collected in a graduated cylinder. The contents of the flask were heated while stirring at a rate of 33 rpm to 200° C. over a period of 60 minutes at which 5 ml of acetic acid had been collected. The reaction temperature was then gradually raised at a rate of about 1° C./min to 320° C. at which time 51 ml of acetic acid had been collected. The flask was heated at 320° C. for another 30 minutes. A total of 54 ml of acetic acid had been collected. The flask was then evacuated to a pressure of 1.0 mar at 320° C. while stirring. During this period the polymer melt continued to increase in viscosity while the remaining acetic acid was removed from the flask.

The resulting polyester had an inherent viscosity (IV) of 2.7 dl/g as determined in a pentaflurophenol solution of 0.1 percent by weight concentration at 60° C. When the polymer was subject to differential scanning calorimetry (10° C./min heating rate), it exhibited a glass transition temperature (Tg) of 116° C., a melt temperature (Tm, defined as the peak temperature of a melt endotherm shown in differential scanning calorimetry) of 249° C. When the polymer was examined by hot-stage cross-polarized optical microscopy, it had a transition temperature from solid to liquid crystalline ($T_{s-1c}$) at 103° C. The polymer melt was optically anisotropic.

EXAMPLE 2

Following the procedure outlined in Example 1, another composition was prepared with resorcinol as an additional monomer. The reaction mixture consisted of 4-hydroxybenzoic acid ("HBA"), 6-hydroxy-2-naphthoic acid ("HNA"), terephthalic acid ("TA"), 4,4'-biphenol ("BP"), resorcinol ("R"), and the 5-ring diacid dye ("5R") in the ratio 30/30/19.5/10/10/0.5. The resulting polymer had an IV of 1.86 dl/g, a Tg of 108° C., and a transition temperature from solid to liquid crystalline ($T_{s-1c}$) at 150° C. The properties were measured as in Example 1.

Example 3. Extrusion of Film:

20 grams of the dyed polyester of Example 1 was compacted into a rod of ⅜ inch diameter. The rod was charged into the melting section of a micro fiber spinning unit. The polymer was molten and fed at a rate 0.56 gr/minute into a melt chamber. A slit die was located at the end of the melt chamber through which the polymer melt was extruded. The dimensions of the slit were ¼ inch by 5 thousandths of an inch. The extruding films were taken up by a take-up roll. During the spinning, the heater temperature was maintained at 300° C., the melt chamber temperature at 299° C. and the die temperature 300° C. The take-up speed of the film was 5 m/minute. The melt drawdown ratio, defined as the ratio of the take-up speed to the exit speed of the extruding film at the die exit, was 9. The width of the tape was 0.2 inches and the thickness 0.5 thousandths of an inch.

Example 4

The polyester of Example 2 was extruded by the same procedure as Example 3 except that the heater temperature was maintained at 280° C., the melt chamber temperature at 278° C. and the die temperature 280° C.

Example 5. Film Characterization

The obtained polarizing films from Examples 3 and 4 had a deep red color, a transmittance of 40% and a polarizing efficiency of 93% for light with the wavelength in the region of 550 nm to 630 nm. This polarizer film was allowed to stand in a thermohydrostat at 100° C. and 95% R.H. for 120 hours and the polarizing coefficient was determined again. The polarizing coefficient now was 92%, showing relatively negligible change of the property.

For comparison, the polarizing coefficients of commercial polarizing films, one based on a PVA film and iodine polarizing agent (Nitto Denko NPF-G1220DV, available from Nitto Denko Corporation, Japan), and the other based on a PVA film and dichroic dye (Nitto Denko NPF-Q-12), were similarly determined under the same conditions. The polarizing films originally had polarizing coefficients 99.95% and 88%, respectively. After the moist thermal treatment outlined above, the films showed significantly lowered polarizing coefficients of 0% and 40%, respectively, demonstrating thereby that the polarizing films of the present invention underwent far less degradation in the polarizing coefficient at 100° C. and 95% R.H., compared with conventional polarizing films.

What is claimed is:

1. A polarizing film having a polarizing efficiency of at least 70% and comprising a film-forming, thermotropic liquid crystal polymer which comprises a dichroic dye moiety in the repeat unit in the main chain of said polymer.

2. The polarizing film of claim 1, wherein said liquid crystal polymer is selected from the group consisting of polyester, polyamide, polyesteramide, polyketone and polyether.

3. The polarizing film of claim 2, wherein said liquid crystal polymer is a polyester.

4. The polarizing film of claim 3, wherein said polyester comprises repeat units corresponding to the formula:

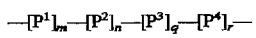

wherein $P^1$, $P^2$, $P^3$ and $P^4$ represent monomeric moieties with $P^1$ being an aromatic hydroxy carboxylic acid, $P^2$ being an aromatic dicarboxylic acid, $P^3$ being a phenol and $P^4$ being the residue of a dichroic dye moiety; and m, n, and q represent mole percent of the respective monomers ranging from 0–70 mole percent individually, and r being at least 0.10 mole percent, with m+n+q+r totalling 100 mole percent.

5. The polarizing film of claim 4, wherein said repeat unit further comprises monomeric moieties —[$P^5$]$_s$— and —[$P^6$]$_t$—, wherein $P^5$ represents a second aromatic hydroxycarboxylic acid moiety different from $P^1$, and $P^6$ represents a second phenolic moiety different from $P^3$.

6. The polarizing film of claim 4, wherein $P^1$ is selected from the group consisting of 4-hydroxybenzoic acid, 2-hydroxy-6-naphthoic acid, 3-phenyl-4-hydroxybenzoic acid, 3-methyl-4-hydroxybenzoic acid, 3chloro-4-hydroxybenzoic acid, and 4-carboxy-4'-hydroxy-1,1'-biphenyl.

7. The polarizing film of claim 4, wherein $P^2$ is selected from the group consisting of terephthalic acid, isophthalic acid, phthalic acid, 2-phenylterephthalic acid, 3-phenylterephthalic acid, 3-methylterephthalic acid, 3-chloroterephthalic acid, 1,2-naphthalenedicarboxylic acid, 1,4-naphthalenedicarboxylic acid, 2,6-naphthalene dicarboxylic acid and 4,4'-biphenyldicarboxylic acid.

8. The polarizing film of claim 4, wherein $P^3$ is selected from the group consisting of resorcinol, hydroquinone, methyl hydroquinone, phenyl hydroquinone, catechol, 4,4'-dihydroxybiphenyl and acetaminophen.

9. The polarizing film of claim 1, wherein said dye is selected from the group consisting of straight chain dye, branched dye, direct dye, disperse dye, solvent dye and acidic dye.

10. The polarizing film of claim 1, wherein said dye is selected from the group consisting of azo dyes, anthraquinone dyes, Basic blue 17, Acid Orange 6, Basic Red 2, Direct Yellow 59, LacMoid, Fluorescein diacetate, Darrow Red, Lauth's Violet, 2,5-bis(4-hydroxyphenyl) pyrazine, and mixtures thereof.

11. The polarizing film of claim 4, wherein $P^4$ has the structural formula:

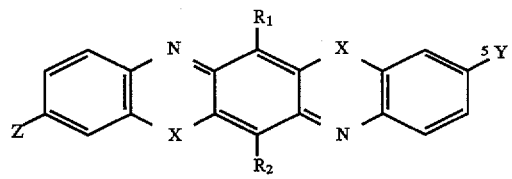

wherein $R_1$ and $R_2$ are the same or different and are independently chosen from hydrogen, halogen, a $C_1$–$C_6$, alkyl, a phenyl or naphthyl moiety; X is O or S; and Y and Z are polymerizable functionalities suitable to be polymerized into repeat units in the main chain of said polyester.

12. The polarizing film of claim 11, wherein said Y and Z are the same or different and are independently selected from the group consisting of —OH, $CO_2H$, —$NH_2$ and —COCl.

13. The polarizing film of claim 12, wherein said $P^4$ has the following structure:

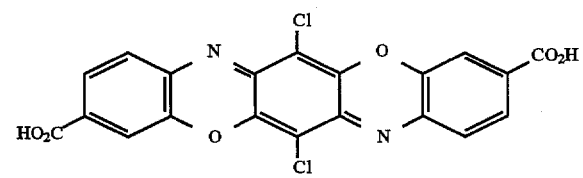

14. The polarizing film of claim 8, wherein $P^3$ is 4,4'-dihydroxybiphenyl.

15. The polarizing film of claim 5, wherein said $P^6$ is a diphenol selected from the group consisting of resorcinol, hydroquinone, catechol, 4,4'-dihydroxybiphenyl, bisphenol-A and acetaminophen.

16. The polarizing film of claim 6, wherein $P^1$ is 4-hydroxybenzoic acid.

17. The polarizing film of claim 6, wherein $P^1$ is 2-hydroxy-6-naphthoic acid.

18. The polarizing film of claim 7, wherein $P^2$ is terephthalic acid.

19. The polarizing film of claim 8, wherein $P^3$ is resorcinol.

20. The polarizing film of claim 8, wherein said $P^3$ is 4,4'-dihydroxybiphenyl.

21. The polarizing film of claim 5, wherein said $P^6$ is resorcinol.

22. A polarizing film having a polarizing efficiency of at least 70% and comprising a film-forming thermotropic liquid crystal polyester which comprises, as repeat units in its main chain, residues of 4-hydroxybenzoic acid, 6-hydroxy-2-naphthoic acid, terephthalic acid, 4,4'-dihydroxybiphenyl and a dichroic dye in a molar ratio of about 30:30:19.5:20:0.5 respectively.

23. The polarizing film of claim 22, wherein said polyester further comprises suitable quantities of residues of resorcinol in said repeat units.

24. A polarizing film having a polarizing efficiency of at least 70% and comprising a film-forming, thermotropic liquid crystal polymer which polymer comprises a plurality of dichroic dye moieties in the repeat unit in the main chain of said polymer.

25. A polarizing film having a polarizing efficiency of at least 70% and comprising a blend of a plurality of film-forming, thermotropic liquid crystal polymers which polymers comprise at least one dichroic dye moiety in the repeat unit in the main chain of said polymer.

26. A process to prepare a polarizing film having a polarizing efficiency of at least 70%, comprising: (a) preparing a film-forming, thermotropic liquid crystal polymer which polymer comprises at least one dichroic dye moiety in the repeat unit in the main chain; and (b) melt extruding said polymer under suitable conditions, to prepare the polarizer film.

* * * * *